United States Patent
Kim

(10) Patent No.: US 8,757,659 B1
(45) Date of Patent: Jun. 24, 2014

(54) AIRBAG CUSHION FOR SEAT BELT

(71) Applicant: Hyundai Motor Company, Seoul (KR)

(72) Inventor: Il Hwan Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/869,421

(22) Filed: Apr. 24, 2013

(30) Foreign Application Priority Data

Dec. 3, 2012 (KR) .................. 10-2012-0138823

(51) Int. Cl.
*B60R 21/18* (2006.01)
(52) U.S. Cl.
USPC ............................................... 280/733
(58) Field of Classification Search
USPC .............................................. 280/733, 743.2
See application file for complete search history.

(56) References Cited

U.S. PATENT DOCUMENTS

| | | | |
|---|---|---|---|
| 7,793,973 B2 * | 9/2010 | Sato et al. .................. | 280/730.2 |
| 8,408,594 B2 * | 4/2013 | Kibat ........................... | 280/733 |
| 2012/0306185 A1 * | 12/2012 | Kim et al. .................. | 280/733 |
| 2013/0221642 A1 * | 8/2013 | Arnold et al. ............. | 280/733 |

FOREIGN PATENT DOCUMENTS

| | | |
|---|---|---|
| JP | 2001-260807 A | 9/2001 |
| JP | 2006-027563 A | 2/2006 |
| JP | 2009-029357 A | 2/2009 |
| KR | 10-2007-0070296 | 7/2007 |

\* cited by examiner

*Primary Examiner* — Faye M. Fleming
(74) *Attorney, Agent, or Firm* — Edwards Wildman Palmer LLP; Peter F. Corless

(57) ABSTRACT

Disclosed is an airbag cushion for a seat belt. The airbag cushion includes a main bag, an upper tether, and a lower tether. The main bag includes a center chamber at a central portion thereof, and side chambers provided on opposite sides of the center chamber and in communication with the center chamber such that gas flows between the center chamber and the side chambers. In particular, in the event of a vehicle collision, the side chambers are first filled with the gas and then the gas flows from the side chambers to fill the center chamber. The upper tether is provided to cover a first surface of the main bag. The lower tether is provided to cover a second surface of the main bag and is sewn to the upper tether to define the main bag.

9 Claims, 7 Drawing Sheets

⇨ GAS FLOW OF INFLATOR

AIRBAG CUSHION FOR SEAT BELT

CROSS-REFERENCE TO RELATED APPLICATIONS

This application claims priority under 35 U.S.C. §119 to Korean Patent Application No. 10-2012-0138823, filed on Dec. 3, 2012, in the Korean Intellectual Property Office, the disclosure of which is incorporated herein by reference in its entirety.

BACKGROUND OF THE INVENTION

1. Field of the Invention

The present invention relates to an airbag cushion for a seat belt and more particularly, to an airbag cushion for a seat belt configured so that the airbag cushion is in close contact with a passenger's chest region without being rotated when the airbag cushion is deployed. The airbag cushion thus increases the area of the seatbelt wearer's body supported by the airbag, and enhances safety.

2. Description of the Related Art

Generally, a seat belt is provided on a seat of a vehicle to safely protect a passenger sitting in the seat against an accident that many occur while the vehicle is being driven.

Such a seat belt typically includes a retractor that winds a webbing to accommodate it, an anchor that fixes the webbing pulled out from the retractor to each of left and right pillars of a vehicle body, a tongue that is attached to the webbing passing through the anchor, and a buckle to which the tongue is fastened.

In the event of an accident, the seat belt through the webbing firmly restrains the passenger to prevent his or her body from being ejected forwards from the seat.

However, the seat belt itself cannot sufficiently protect a passenger's body during a collision. In order to address the problem, recently, research and development has been undertaken into the design of an air belt having an airbag cushion deployable from the seat belt.

FIG. 1 shows an operation of an airbag cushion of a conventional air belt. The structure includes an inflator and an air belt. The inflator is installed in an upper portion of a pillar of a vehicle body, and is actuated by an ACU that generates a control signal depending on an impact level of the vehicle. The air belt secures an airbag unit 9 to a webbing 1. Here, the airbag unit 9 is made of a soft material and is supplied with gas through a tube 8 connected to the inflator so as to be inflated and deployed from the webbing 1.

The airbag unit 9 includes a cover 10, an airbag cushion 11, and tear ends 10a. The cover 10 is stitched at both ends thereof to be secured to the webbing 1 and is woven to surround the webbing 1. The airbag cushion 11 is woven so as to be fillable with the gas at a portion covering the webbing 1 in the cover 10, and is supplied with the gas through the tube 8 for inflation. The tear ends 10a form both ends of the cover 10, and are fused or stitched to each other at a side while surrounding the webbing 1 and the airbag cushion 11 such that the tear ends 10a are separated from each other when the airbag cushion 11 is deployed.

However, the conventional airbag cushion is problematic in that it is deployed in a rotating manner towards a side of the webbing when the airbag cushion is inflated by the inflator, so that the airbag cushion may undesirably be positioned in a location other than a passenger's chest region. With such positioning, shock cannot be sufficiently absorbed by the airbag cushion.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an object of the present invention is to provide an airbag cushion for a seat belt configured so that the airbag cushion is in close contact with a passenger's chest region. In particular, the present invention provides an airbag cushion for a seat belt configured so as to avoid rotation when the airbag cushion is deployed, thereby increasing an area of the passenger's body supported by the airbag cushion and enhancing safety.

According to one aspect, the present invention provides an airbag cushion for a seat belt, including a main bag; an upper tether provided to cover a first surface of the main bag; and a lower tether provided to cover a second surface of the main bag, and sewn to the upper tether to define the main bag between the lower tether and the upper tether. In particular, the main bag includes a center chamber positioned at a central portion of the main bag, and side chambers provided on opposite sides of the center chamber and in communication with the center chamber. In particular, the center chamber and side chambers are configured in such a way that gas flows between the center chamber and the side chambers, so that, in the event of a vehicle collision, the side chambers are filled with the gas and then the gas flows from the side chambers to fill the center chamber. According to various embodiments, a middle portion of the main bag is sewn in a longitudinal direction thereof to divide the center chamber from the side chambers. Further, an inlet may be provided on a first end of the main bag to permit inflow of the gas, and a first end of the center chamber facing the inlet may be sewn to be closed. As such, gas introduced into the inlet first flows to the side chambers provided on the opposite sides of the center chamber.

According to various embodiments, a second end of the center chamber is not sewn, and a predetermined portion between the center chamber and each of the side chambers are not sewn, thus allowing the center chamber to communicate with the side chambers.

According to various embodiments, each of first and second ends of the center chamber include a webbing hole into which a webbing is fitted.

According to various embodiments, a first tether of the upper tether is sewn at a first side thereof to a first side of the main bag, and a second tether of the upper tether is sewn at a first side thereof to a second side of the main bag. Further, a second side of the first tether and a second side of the second tether may overlap each other to cover the main bag. Further, the second side of the first tether may be sewn to a middle portion of the second tether and the second side of the second tether may be sewn to a middle portion of the first tether.

According to various embodiments, an insert space is provided in an overlapping portion between the first and second tethers, so that the webbing passes through and is fitted within the insert space.

According to various embodiments, a support plate is further inserted within the insert space.

According to various embodiments, the support plate is made of a hard material, and a width of the support plate is greater than a width of the webbing.

According to various embodiments, the support plate is provided between the webbing and the main bag.

Other features and aspects of the present invention will be apparent from the following detailed description, drawings and claims.

BRIEF DESCRIPTION OF THE DRAWINGS

The above and other objects, features and advantages of the present invention will be more clearly understood from the following detailed description taken in conjunction with the accompanying drawings, in which.

Figure 1:
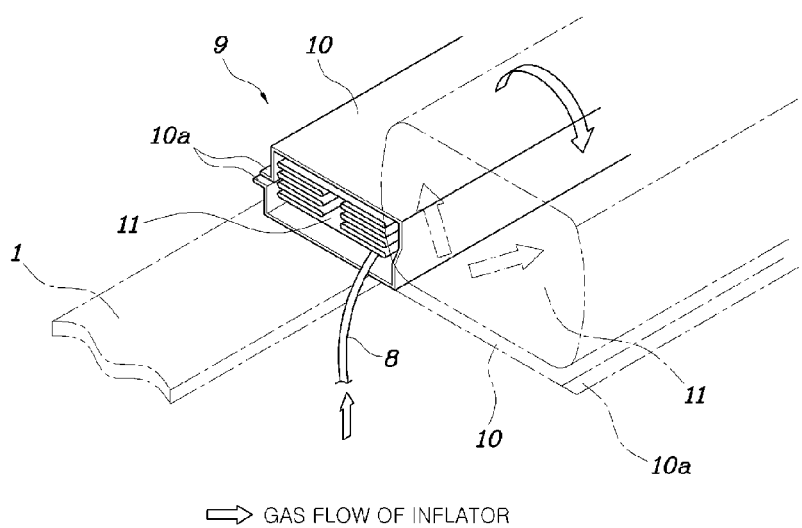
FIG. 1 is a view showing an operation of an airbag cushion of a conventional air belt.

It should be understood that the appended drawings are not necessarily to scale, presenting a somewhat simplified representation of various preferred features illustrative of the basic principles of the invention. The specific design features of the invention as disclosed herein, including, for example, specific dimensions, orientations, locations and shapes, will be determined in part by the particular intended application and use environment. The specific solar cell type of the invention as disclosed herein will be determined in part by the particular intended application and use environment.

In the figures, reference numerals refer to the same or equivalent parts of the disclosure throughout the several figures of the drawings.

DESCRIPTION OF PREFERRED EMBODIMENTS

Hereinafter, the preferred embodiment of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 10, 0.50, 0.1%, 0.05%, or 0.01% of the stated value. Unless otherwise clear from the context, all numerical values provided herein are modified by the term "about".

Figure 2:
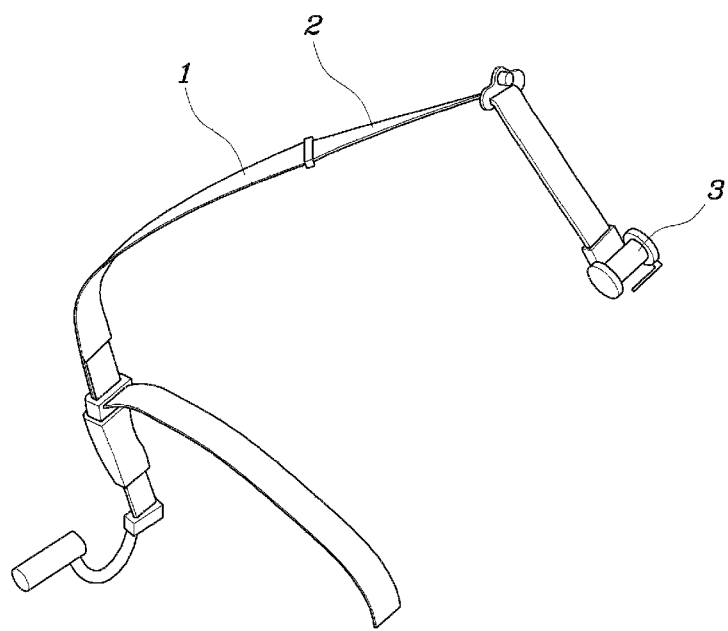
FIG. 2 is a view showing a state in which an airbag cushion is installed at a seat belt according to an embodiment of the present invention.

FIG. 2 is a view showing a state in which an airbag cushion is installed at a seat belt according to an embodiment of the present invention.

Referring to FIG. 2, the airbag cushion for the seat belt according to the present invention is installed at a shoulder webbing to support a passenger's chest region. Preferably, the shoulder webbing may be wound or unwound using a retractor 3.

Figure 3:
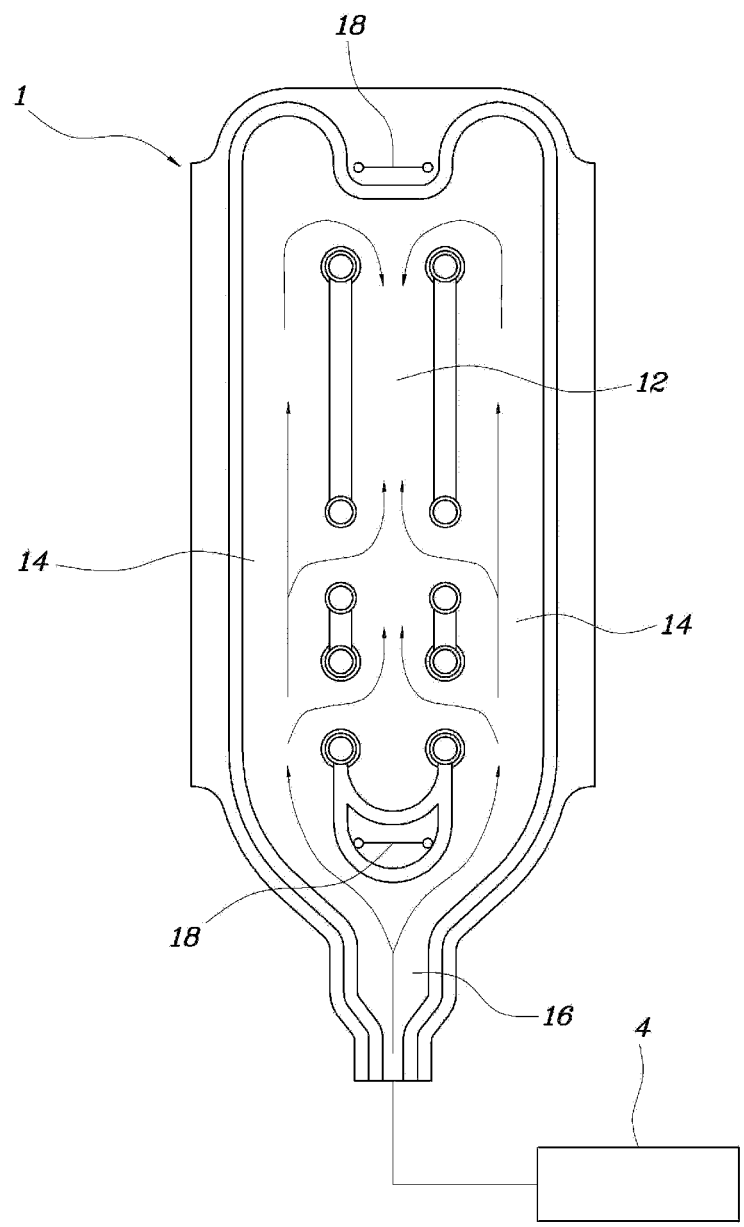
FIG. 3 is a view illustrating a deployed state and a gas flow of the airbag cushion for the seat belt according to an embodiment of the present invention.

FIG. 3 is a view illustrating a deployed state and gas flow of the airbag cushion for the seat belt according to an embodiment of the present invention.

In particular, the airbag cushion for the seat belt mainly includes a main bag 10, an upper tether 20 and a lower tether 30.

As depicted in FIG. 3, in the airbag cushion, the main bag 10 includes a center chamber 12 on a central portion thereof, and side chambers 14 provided on opposite sides of the center chamber 12. The side chambers are in communication with the center chamber 12 in such a way that gas flows between the center chamber 12 and the side chambers 14. Thus, for example, in the event of a vehicle collision, the side chambers 14 are filled with the gas and then gas flows from the side chambers 14 to the center chamber 12, thereby filling the center chamber 12 with the gas. The upper tether 20 is provided to cover a first surface of the main bag 10, and the lower tether 30 is provided to cover a second surface of the main bag 10. In particular, the lower tether 30 is sewn to the upper tether 20 to define the main bag 10 between the lower tether 30 and the upper tether 20.

Figure 4:
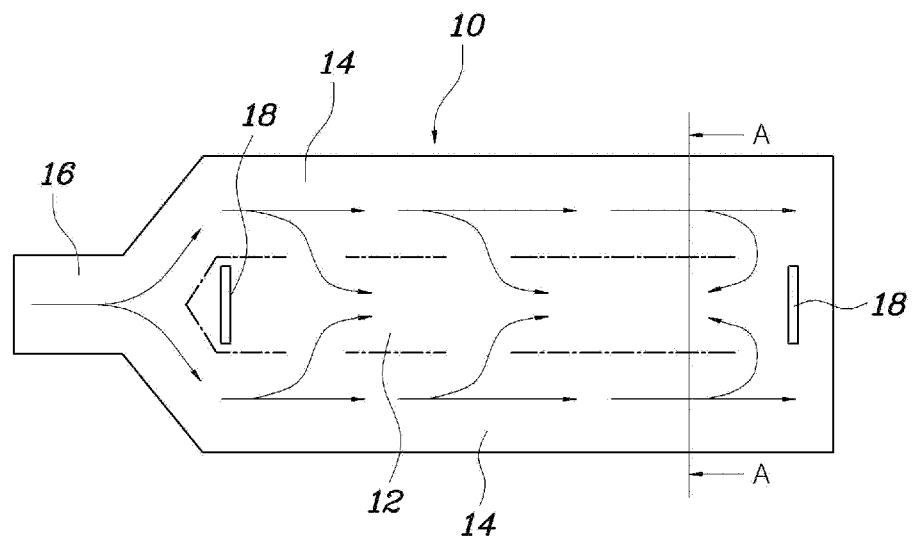
FIG. 4 is a view showing the configuration of a center chamber and side chambers in a main bag according to an embodiment of the present invention.
Figure 5:
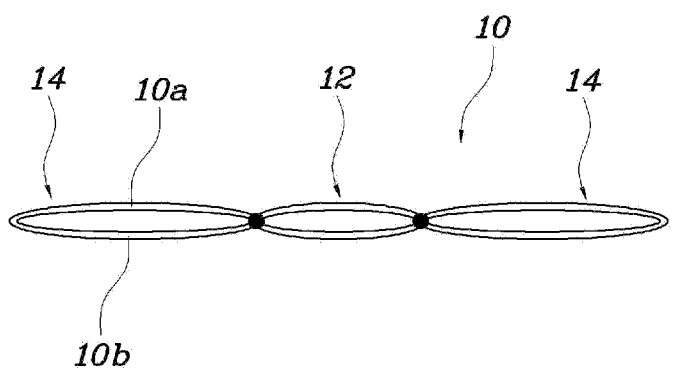
FIG. 5 is a sectional view taken along line A-A of FIG. 4.

FIG. 4 is a view showing the configuration of the center chamber 12 and side chambers 14 in the main bag 10 according to an embodiment of the present invention, and FIG. 5 is a sectional view taken along line A-A of FIG. 4.

The configuration of the main bag 10 will be described in detail with reference to FIGS. 4 and 5. First, the main bag 10 is filled with gas, to thus be inflated and deployed in the case of a vehicle impact. The center chamber 12 is provided in a central portion of the main bag 10, and the side chambers 14 are provided, respectively, on opposite sides of the center chamber 12.

As shown, the center chamber 12 communicates with the side chambers 14 so that the gas can flow therebetween. Thus, if a vehicle collision is sensed and the inflator 4 is actuated, the side chambers 14 are first filled with the gas introduced through the inflator 4. Thereafter, gas from the side chambers 14 flows into the center chamber 12 to fill the center chamber 12.

That is, the side chambers 14 provided on opposing sides of the center chamber 12 are inflated and deployed prior to the center chamber 12. As a result, the airbag cushion 1 is not rotated while it is inflated and deployed. Consequently, the airbag cushion 1 comes into close contact with a passenger's body, and enhances the safety provided by the airbag cushion 1.

According to various embodiments, the main bag 10 is made by sewing an edge of an upper cushion 10a to an edge of a lower cushion 10b (e.g. see FIG. 5). Two sewing lines can be formed on a middle portion of the main bag 10 in a longitudinal direction thereof. Such a sewing structure partitions the main bag 10 into the center chamber 12 and the side chambers 14.

Further, an opening or inlet 16 can be formed at an end of the main bag 10, and the inflator 4 can be in connection with the inlet 16. As such, gas flows from the inflator 4 into the inlet 16, thereby filling the interior of the main bag 10 with the gas.

Furthermore, a first end portion of the center chamber 12 facing the inlet 16 can be sewn closed, so that the gas introduced into the inlet 16 is first guided to the side chambers 14 provided on the opposite sides of the center chamber 12. As a result, the side chambers 14 are filled with the gas to be inflated prior to filling the center chamber 12.

Further, a second end of the center chamber 12 can be left unsewn, so that the center chamber 12 communicates with the side chambers 14. Thereby, the gas filling the side chambers 14 can further flow through the second end of the center chamber 12 into the center chamber 12 to fill the center chamber 12.

In addition, sewing can be performed between the center chamber 12 and the side chambers 14 to separate space of the center chamber 12 from space of the side chambers 14. However, a predetermined portion between the center chamber 12 and each of the side chambers 14 is preferably not sewn together, thus providing communication between the center chamber 12 and the side chambers 14. As a result, the gas filling the side chambers 14 flows into the center chamber 12 to fill the center chamber 12.

In particular, the gas first fills each side chamber 14, and then flows into the center chamber 12 so that the center chamber 12 is inflated and deployed. Such a configuration improves the performance of deploying the airbag cushion 1.

Further, as shown in FIG. 4, each of first and second ends of the center chamber 12 can include a webbing hole 18 into which a webbing 2 is fitted. Preferably, each webbing hole 18 is formed so as to not interfere with the side chambers 14. In other words, the webbing holes 18 are preferably formed such that the gas introduced into the side chambers 14 does not escape therethrough.

Figure 6:
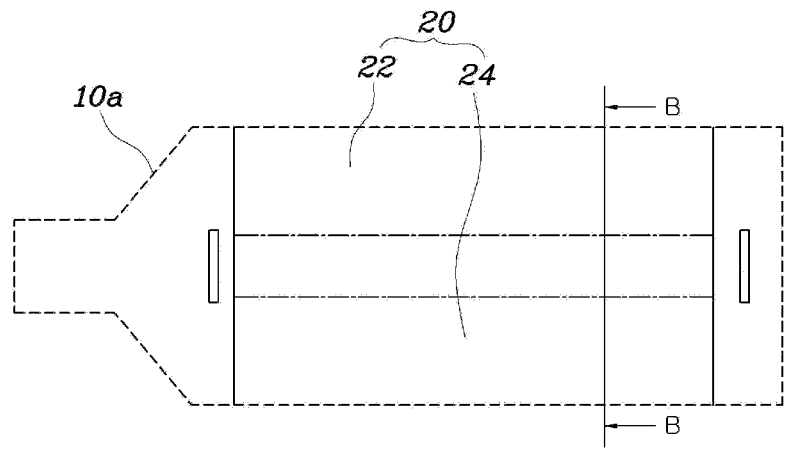
FIG. 6 is a view showing the configuration of an upper tether according to an embodiment of the present invention.
Figure 7:
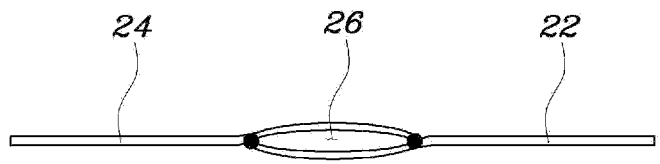
FIG. 7 is a sectional view taken along line B-B of FIG. 6.

FIG. 6 is a view showing the configuration of the upper tether 20 according to an embodiment of the present invention, and FIG. 7 is a sectional view taken along line B-B of FIG. 6.

The configuration of the upper tether 20 will be described in detail with reference to FIGS. 6 and 7. The upper tether 20 is provided to cover a first surface of the main bag 10. When the passenger fastens the seat belt, the upper tether 20 is placed opposite the passenger's body towards the front of the vehicle.

As shown in FIGS. 6 and 7, the upper tether 20 includes a first tether 22 sewn at a first side thereof to a first side of the main bag 10, and a second tether 24 sewn at a first side thereof to a second side of the main bag 10. Further, a second side of the first tether 22 and a second side of the second tether 24 overlap each other to cover the main bag 10 (see FIG. 10A). The second side of the first tether 22 may be sewn to a middle portion of the second tether 24, and the second side of the second tether 24 may be sewn to a middle portion of the first tether 22.

As shown in FIG. 7, an insert space 26 can be provided in an overlapping portion between the first and second tethers 22 and 24, so that the webbing 2 passes through and is fitted within the insert space 26.

Figure 8:
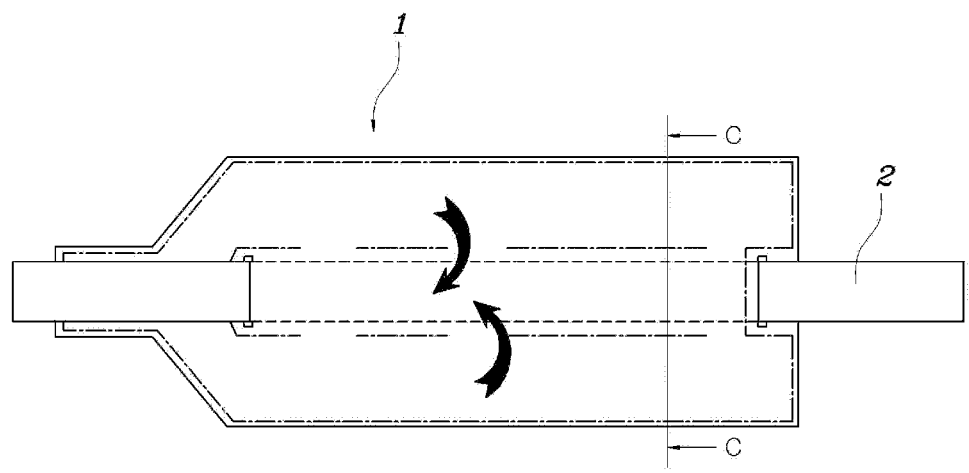
FIG. 8 is a view showing a configuration in which a webbing is fitted into the airbag cushion according to an embodiment of the present invention.
Figure 9:
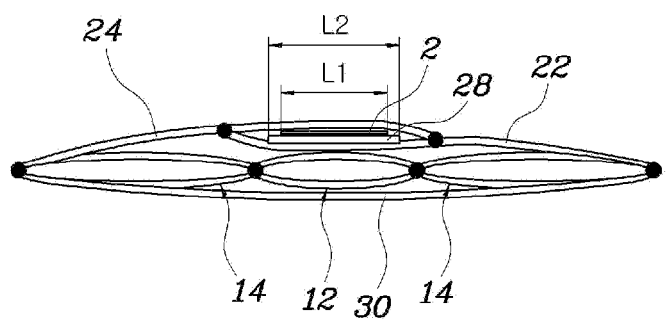
FIG. 9 is a sectional view taken along line C-C of FIG. 8.

FIG. 8 is a view showing a configuration in which the webbing 2 is fitted into the airbag cushion according to an embodiment of the present invention, and FIG. 9 is a sectional view taken along line C-C of FIG. 8.

Referring to FIGS. 8 and 9, the lower tether 30 of the present invention is provided to cover the second surface of the main bag 10. When the passenger fastens the seat belt, the lower tether 30 is placed against and towards his or her body.

Such a lower tether 30 may be sewn to the upper tether 20 to define the main bag 10 between the lower tether 30 and the upper tether 20. When sewing the lower tether 30 and the upper tether 20, the lower tether 30 and the upper tether 20 can be sewn to the main bag 10 together to manufacture the airbag cushion 1.

That is, the upper tether 20 and the lower tether 30 may be configured to surround the first surface and the second surface of the main bag 10, respectively. Thus, when the airbag cushion 1 is deployed, the pressure of the airbag cushion 1 is adjusted to evenly deploy the airbag cushion 1 (i.e. without rotation). As a result, in the event of a vehicle collision, an area of the airbag cushion 1 contacting the passenger's chest region is increased, thus reducing an injury to the passenger.

As shown in the drawings, the airbag cushion 1 is normally positioned so that the side chambers 14 and the lower and upper tethers 30 and 20 provided at positions corresponding to the side chambers 14 are folded over the center chamber 12. However, in the event of a vehicle collision, the side chambers 14 are inflated and deployed as they unfold to the left and right.

Further, according to the present invention, a support plate 28 may be further inserted within the insert space 26 defined between the first and second tethers 22 and 24. Here, the support plate 28 may be made of a hard material, such as, but not limited to any variety of hard plastics. A width L2 of the support plate 28 may be greater than a width L1 of the webbing 2 (see FIG. 9). Also, the support plate 28 may be provided between the webbing 2 and the main bag 10.

In other words, in the event of a vehicle collision, the webbing 2 is supported by the support plate 28. As such, the support plate 28 is pressed and supported against the main bag 10. Since the width L2 of the support plate 28 is at least greater than the width L1 of the webbing 2, the area supported by the main bag 10 is increased. As a result, the body area supported by the main bag 10 is also increased, thus enhancing the crashworthiness provided by the airbag cushion 1.

Figure 10A:
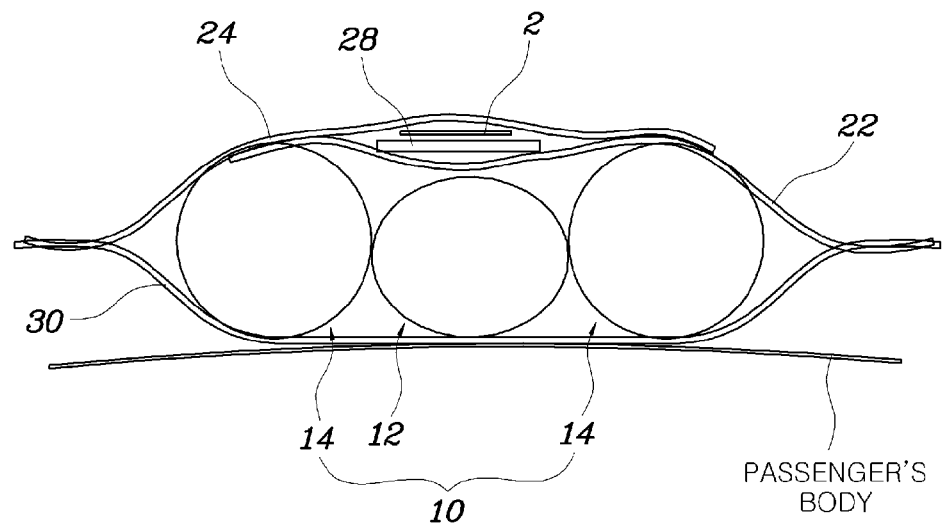
FIGS. 10A and 10B are views illustrating an operation in which the airbag cushion of an embodiment of the present invention is deployed.
Figure 10B:
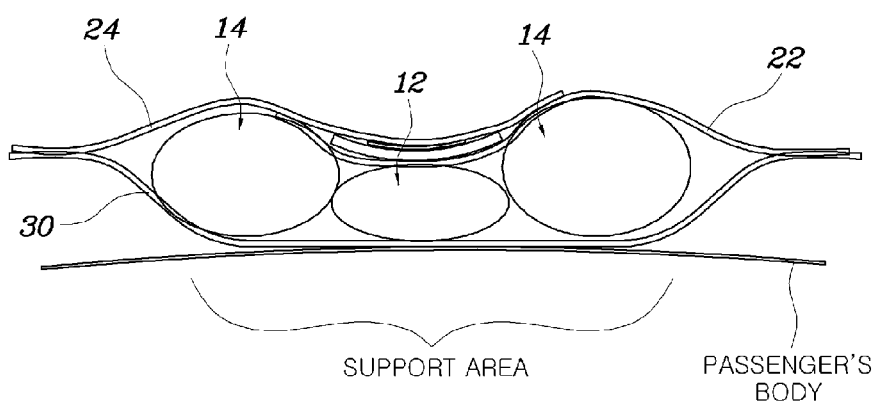

FIG. 10A is a view showing a state in which the airbag is deployed immediately after a vehicle collision, and FIG. 10B is a view showing a state in which the webbing 2 is pressed against the airbag cushion 1 of FIG. 10A and is supported by the chest region of a passenger.

An operation of the airbag cushion 1 according to the present invention will be described with reference to FIGS. 3, 10A and 10B. First, when a collision or accident of the vehicle occurs, as shown in FIG. 10A, the inflator 4 is actuated to cause gas to flow from the inflator 4 through the inlet 16 and into the main bag 10.

Here, the center chamber 12 of the main bag 10 is sewn to be closed in a direction towards the inlet 16. Thus, the gas introduced into the inlet 16 first flows into the side chambers 14, and subsequently fills the center chamber 12. Thus, the side chambers 14 are first inflated, and subsequently the center chamber 12 is inflated. Hence, when the airbag cushion 1 is deployed, rotation of the airbag cushion 1 is prevented to provide more reliable support to the passenger's body.

Thereafter, as shown in FIG. 10B, the passenger's body is strongly supported by the webbing 2, and the main bag 10 is compressed by the webbing 2. Here, the support plate 28, which is wider than the webbing 2, is supported by the main bag 10 so that an area pressing towards the main bag 10 increases. Consequently, the area of the airbag cushion 1 contacting the passenger's body increases to more safely protect the passenger.

As described above, the present invention provides an airbag cushion for a seat belt, in which side chambers provided on both sides of a center chamber are inflated and deployed prior to the center chamber. As a result, the airbag cushion is not rotated when the airbag cushion is deployed, thus enhancing the protection provided by the airbag cushion.

Moreover, an upper tether and a lower tether can be configured to surround opposite surfaces of a main bag, thus adjusting pressure of an airbag cushion so that the airbag cushion can be evenly deployed, and increasing an area of the airbag cushion contacting a passenger's chest region in the event of a vehicle's collision. As a result, potential injury to a passenger is reduced.

Further, a support plate supported by the main bag can be installed together with a webbing and can be provided with a width greater than that of the webbing, thus increasing an area supported by the main bag, and consequently increasing an area of a passenger's body supported by the body via the main bag. As a result, the protection provided by an airbag cushion is enhanced.

It is noted that while various parts and components are described herein as being "sewn" together, it is to be understood that various other means of attachment (such as attachment through adhesives and the like) can alternatively be provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An airbag cushion for a seat belt, comprising:
    a main bag including a center chamber at a central portion thereof, and side chambers provided on opposing sides of the center chamber, the side chambers being in communication with the center chamber in such a way that, in the event of a vehicle collision, the side chambers are first filled with a gas and, subsequently, the gas flows from the side chambers to the center chamber, thereby filling the center chamber with the gas;
    an upper tether extending to cover a first surface of the main bag; and
    a lower tether extending to cover a second surface of the main bag, the lower tether attached to the upper tether to define the main bag between the lower tether and the upper tether
    wherein each of first and second ends of the center chamber comprise a webbing hole into which a webbing is fitted.

2. The airbag cushion as set forth in claim 1, wherein a middle portion of the main bag is connected along a longitudinal direction thereof to separate the center chamber from the side chambers,
    an inlet is provided on a first end of the main bag to permit inflow of the gas, and
    a first end of the center chamber facing the inlet is closed to prohibit the entry therethrough of gas from the inlet into the center chamber, wherein the gas introduced into the inlet first flows to the side chambers provided on the opposite sides of the center chamber.

3. The airbag cushion as set forth in claim 2, wherein the middle portion of the main bag is connected by sewing, and the first end of the center chamber facing the inlet is closed by sewing.

4. The airbag cushion as set forth in claim 2, wherein a second end of the center chamber is not closed, and a predetermined portion between the center chamber and each of the side chambers is not connected, thus providing communication between the center chamber and the side chambers.

5. The airbag cushion as set forth in claim 1, wherein a first tether of the upper tether is attached at a first side thereof to a first side of the main bag,
    a second tether of the upper tether is attached at a first side thereof to a second side of the main bag,
    a second side of the first tether and a second side of the second tether overlap each other to cover the main bag, and
    the second side of the first tether is attached to a middle portion of the second tether and the second side of the second tether is attached to a middle portion of the first tether.

6. The airbag cushion as set forth in claim 5, wherein an insert space is provided in an overlapping portion between the first and second tethers, so that the webbing passes through and is fitted within the insert space.

7. The airbag cushion as set forth in claim 6, wherein a support plate is further inserted within the insert space.

8. The airbag cushion as set forth in claim 7, wherein the support plate is made of a hard material, and a width of the support plate is greater than a width of the webbing.

9. The airbag cushion as set forth in claim 7, wherein the support plate is provided between the webbing and the main bag.

* * * * *